United States Patent [19]

Madeira et al.

[11] 3,976,044

[45] Aug. 24, 1976

[54] BREAKERLESS DISTRIBUTOR WITH SUBSTITUTIONAL INTERRUPTER ARRAY

[75] Inventors: John W. Madeira, Stamford; Kenneth E. Merklen, Cos Cob, both of Conn.

[73] Assignee: Gulf & Western Industries, Inc., New York, N.Y.

[22] Filed: May 15, 1975

[21] Appl. No.: 577,841

[52] U.S. Cl. .......................... 123/148 F; 123/148 E; 200/19 DR; 200/19 M

[51] Int. Cl.[2] ...................... H01R 39/02; G01D 5/36

[58] Field of Search ................. 123/148 E, 146.5 A, 123/148 F; 200/19 DR, 19 M, DIG. 7

[56] References Cited

UNITED STATES PATENTS

| | | | |
|---|---|---|---|
| 2,839,622 | 6/1958 | Billings | 20/DIG. 7 |
| 3,249,707 | 5/1966 | Johnson et al. | 200/19 M |
| 3,281,734 | 10/1966 | Ansley | 200/19 M |
| 3,504,141 | 3/1970 | Webster | 200/19 DR |
| 3,751,610 | 8/1973 | Bednarz | 123/146.5 A |
| 3,792,261 | 2/1974 | Canup et al. | 123/148 E |
| 3,822,686 | 7/1974 | Gallo | 123/148 E |
| 3,861,370 | 1/1975 | Howard | 123/148 E |

*Primary Examiner*—Wendell E. Burns
*Assistant Examiner*—James W. Cranson, Jr.
*Attorney, Agent, or Firm*—Colton & Stone, Inc.

[57] ABSTRACT

In the conversion of a standard ignition distributor to a breakerless distributor advantage is taken of mounting apertures, preformed in the distributor rotor, to permit the selective mounting of one of a plurality of annular interrupter arrays. One purpose is to permit the use of a standardized rotor with which the selected interrupter array, corresponding to the number of engine cylinders, may be integrated via the preformed mounting apertures.

5 Claims, 5 Drawing Figures

FIG. 3
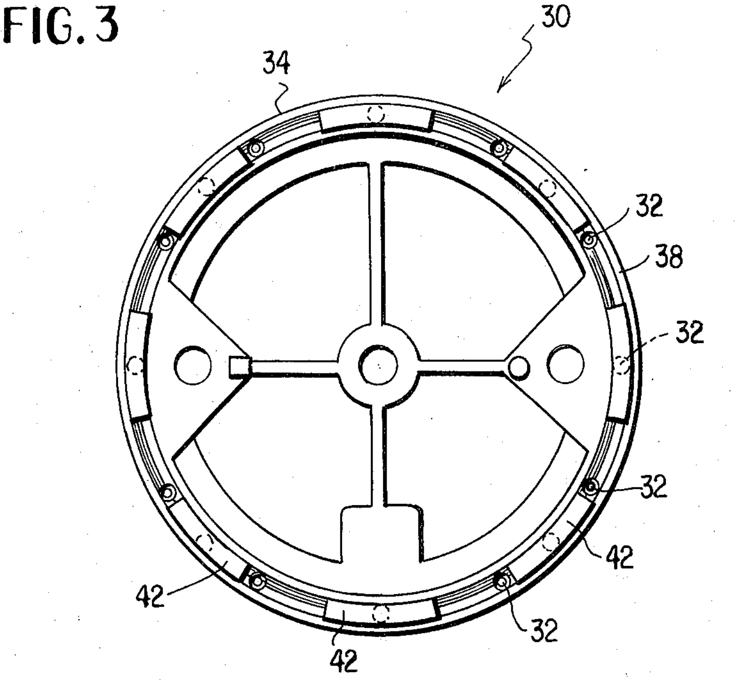
FIG. 4
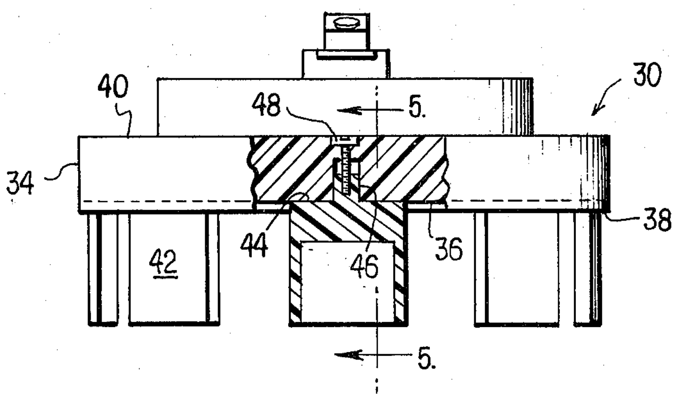
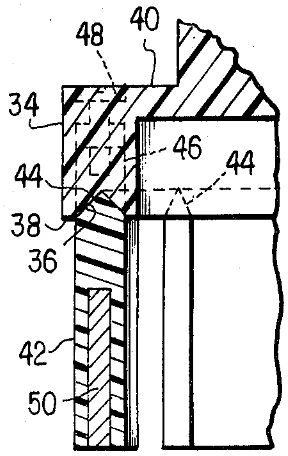
FIG. 5

BREAKERLESS DISTRIBUTOR WITH SUBSTITUTIONAL INTERRUPTER ARRAY

BACKGROUND OF THE INVENTION

The invention is directed, broadly, to those breakerless ignition systems requiring an annular interrupter array irrespective of whether the pulse generating circuit is optically or magnetically controlled. Exemplary breakerless systems of the type contemplated are disclosed in U.S. Pat. Nos. 3,792,261; 3,822,686; and 3,861,370. The invention is more specifically concerned with the conversion of conventional distributors employing cam operated breaker assemblies to breakerless distributors.

Breakerless control mechanisms normally employ a housing structure defining a discrete, arcuate air gap through which an annular interrupter array is rotated at a speed proportional to engine speed. The housing structure, containing the optical or magnetic components as the case may be which are modulated by the passage of the interrupter array through the air gap, is conventionally integrated with the vacuum advance plate via the preformed breaker assembly and/or condenser mounting apertures therein while the conventional interrupter array is mounted for rotation with the distributor drive shaft. The criticality of close tolerance positioning of these coacting control means has previously dictated either a specifically designed breakerless distributor assembly or expensive adaptations for retrofit of conventional distributors. The latter primarily for the reason that advantage has not been taken of locator mountings preformed for the annular interrupter array on an already precision distributor part as is conventional practice in the integration of the coacting housing structure with preformed mounting apertures in the vacuum advance plate. Stated differently, although a standardized housing structure defining the air gap portion of the control system may be reproducibly located on a given conventional distributor model via the preformed mounting apertures in a precision located part, i.e. the vacuum advance plate; the interrupter array has not previously been so located, radially of the axis of rotation, with respect to an already precision mounted part. Rather, previous interrupter arrays have been interconnected with the drive shaft by various means such as a shaft secured retrofit plate assembly or a press fit with the drive shaft or breaker cam. The close tolerance machining and assembly procedures required to assure concentric rotation of the interrupter elements taken with the necessity for stocking different interrupter configurations for retrofitting a common distributor model to accommodate engines having different numbers of cylinders are primarily responsible for the aforesaid "expensive adaptations".

SUMMARY OF THE INVENTION

Advantage is taken of the fact that the distributor rotor, carrying the central and movable contacts, is necessarily a precision part mounted to close running tolerances by integrating a desired interrupter array with the rotor via preformed mounting apertures in the rotor. Since the mounting apertures are preformed in the rotor the tolerance problem reduces to one of insuring that the interrupter elements comprising the annular interrupter array are formed with a common radius of curvature. Subject to this condition and assuming a standardized production of the mounting apertures, the annular interrupter array will rotate concentrically with the rotor contact and this concentricity is assured upon mounting of different interrupter arrays upon the rotor of a common model distributor.

DESCRIPTION OF THE DRAWINGS

FIG. 3 is a bottom plan view of a universal distributor rotor adapted to be substituted for the rotor of FIGS. 1 and 2 and illustrating the integration therewith of an interrupter array for an eight cylinder engine via eight of 16 preformed mounting apertures;

FIG. 4 is a side elevation, with parts in section, of the rotor of FIG. 3; and

FIG. 5 is a vertical section taken along line 5—5 of FIG. 4

DESCRIPTION OF THE PREFERRED EMBODIMENTS

Figure 1:
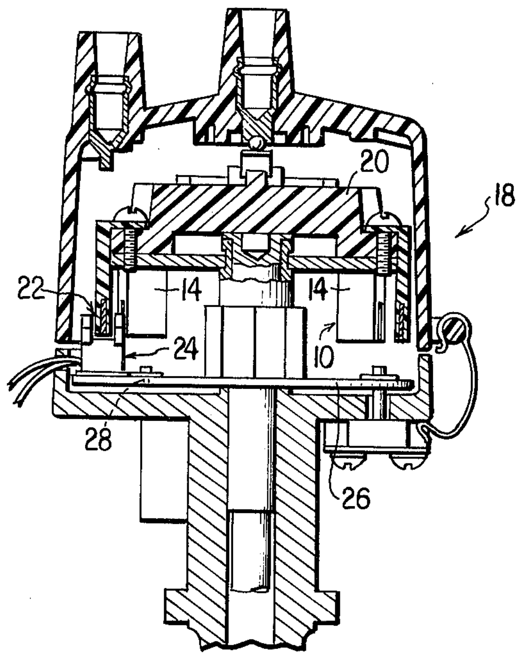
FIG. 1 is a vertical section, with parts in elevation, of a breakerless distributor for an eight cylinder engine.

In view of the desired capability to convert a given model distributor into a breakerless distributor which may be used with any of four, six, eight or twelve cylinder engines; unitary interrupter arrays were first produced having a standard diameter and varying numbers of depending interrupter elements corresponding to the number of engine cylinders. Exemplary are the contrasting interrupter arrays 10, 12 illustrated in FIGS. 1 and 2 having eight and six interrupter elements 14, 16, respectively, and a common diameter for selective use with a common distributor model to convert the same into a breakerless distributor 18. In any event, whether the interrupter array includes four, six, eight or twelve interrupter elements; the same is mounted, as illustrated for an eight cylinder engine in FIG. 1, on rotor 20 for rotation of interrupter elements 14 through air gap 22 formed in housing structure 24 integrated with vacuum advance plate 26 via preformed mounting apertures 28.

Figure 2:
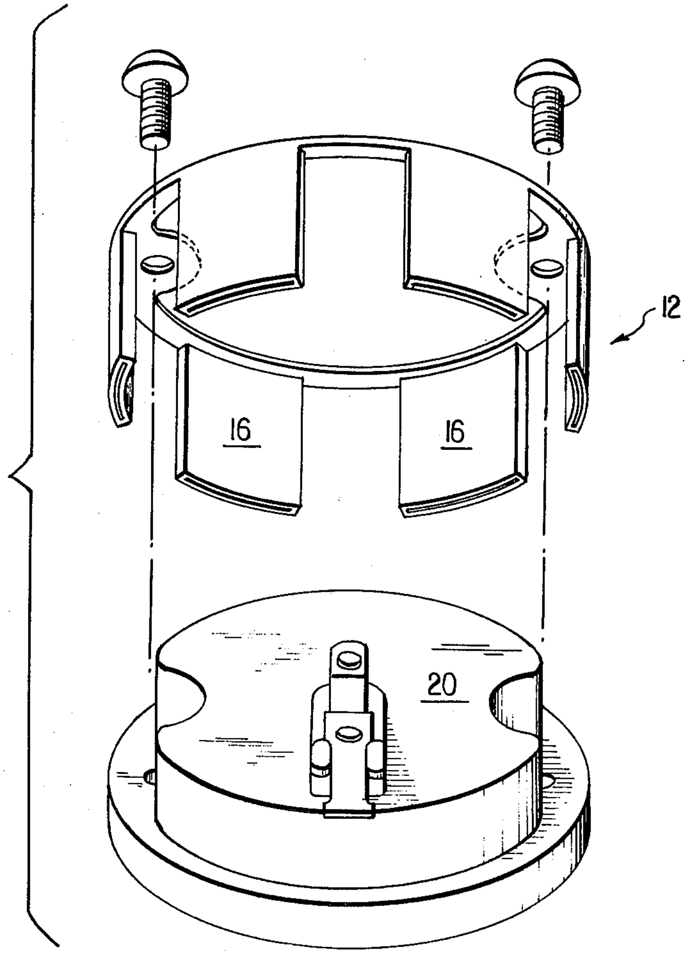
FIG. 2 is an exploded perspective illustrating an interrupter array for a six cylinder engine.

The use of a universal rotor 30 differing from the conventional rotor 20 of FIGS. 1 and 2 only in a modification of the peripheral portion thereof to include preformed mounting apertures 32 for individual ones of individual interrupter elements to permit of retrofitting the rotor to accommodate any of four, six, eight or twelve cylinder engines is illustrated in FIGS. 3–5.

Rotor 30 is provided with an outer peripheral skirt 34 having an annular V shaped groove 36 formed on the undersurface 38 thereof which is intersected by 16 preformed mounting apertures 32 opening to the upper surface 40 of skirt 34. Mounting apertures 32 are positioned in a repeating pattern of 30°, 15°, 15°, 30° about the rotor to permit the installation of four, six, eight or twelve individual interrupter elements on equal center spacings to produce the desired annular interrupter array. The individual interrupter elements comprising a particular interrupter array are, of course, identical and each interrupter element 42 includes as arcuate body portion whose upper edge wall includes a V shaped projection 44 interrupted centrally by an upstanding lug 46 which projection and lug are matingly received in V groove 36 and a preformed mounting aperture 32, respectively. The upper ends of lugs 46 terminate short of the upper surface 40 of skirt 34 and each lug is centrally tapped for the receipt of a threaded fastener 48 to integrate the individual interrupter elements with rotor 30.

When retrofitting a conventional distributor for an eight cylinder engine, interrupter elements 42 are integrated with rotor 30 via the preformed mounting apertures 32 at the 45°, 90°, 135°, 180°, 225°, 270°, 315° and 360° positions as illustrated in FIG. 3. When retrofitting for a six cylinder engine the interrupter elements are positioned at the 60°, 120°, 180°, 240°, 300° and 360° positions as will be apparent.

While the interrupter elements making up a particular interrupter array (i.e. four, six, eight or twelve cylinder) will always be identical, the arcuate length and/or physical composition of the interrupter elements to be integrated with the rotor are a function of the particular engine and/or control system (i.e. optical or magnetic) to be used for triggering the pulse generation circuit. Thus the arcuate lengths of the interrupter elements comprising a particular interrupter array for, say, an eight cylinder engine will be greater or lesser than the elements of an interrupter array for an engine having a greater or lesser number of cylinders. Contrast, for example, the arcuate lengths of the eight and six interrupter elements illustrated by FIGS. 1 and 2, respectively. Similarly, the identical interrupter elements comprising a particular interrupter array, e.g. eight cylinder, may require a greater or lesser arcuate length depending on the type control system to be employed, viz. whether the pulse generating circuit is to be triggered by the presence or absence of the interrupter elements. The physical composition of the interrupter elements may vary as a function of whether an optical or magnetic system is employed such as illustrated by the ferrous embedments 50 (FIG. 5) which would be required when the coacting control structure comprises a Hall generator, for example.

Where it is contemplated that the universal rotor will be empolyed for retrofit to both magnetic and optical systems the interrupter elements 42 may all include the embedment 50.

It will be seen that the use of universal rotor 30 in substitution for the rotor 20 of FIG. 1 permits the substitutional use of a desired interrupter array with a common rotor construction.

Although the particular pulse generating circuit and the type control means therefor (optical or magnetic) forms no part of the present invention; for illustrative purposes the air gap forming elements of housing structure 24 may be assumed to house a pair of inductively linked coils whose signal output in response to the rotation of interrupter elements 42 triggers a pulse generating circuit of the type illustrated in U.S. Pat. No. 3,822,686.

We claim:

1. In a breakerless ignition distributor having a drive shaft extending upwardly through a vacuum advance plate and drivingly engaging a governor assembly and a distributor rotor, said distributor rotor having central spring and movable contact means secured thereto, preformed mounting apertures in each of said vacuum advance plate and distributor rotor, coacting breakerless distributor control means carried by said vacuum advance plate and distributor rotor, one of said coacting control means integrated with said vacuum control plate via said preformed mounting apertures and the other of said control means comprising an annular interrupter array including a plurality of spaced interrupter elements, the improvement comprising; mounting means removably mounting said spaced interrupter elements to said distributor rotor whereby alternate arrays of interrupter elements may be substitutionally integrated with said distributor rotor via the preformed mounting apertures in said rotor.

2. The breakerless ignition distributor of claim 1 wherein said mounting means comprises a plurality of threaded fasteners.

3. The breakerless ignition distributor of claim 2 wherein said one coacting control means comprises optical control means.

4. The breakerless ignition distributor of claim 2 wherein said one coacting control means comprises magnetic control means.

5. The breakerless ignition distributor of claim 4 wherein each said spaced interrupter element includes a metallic embedment.

* * * * *